(12) United States Patent
Cho et al.

(10) Patent No.: US 9,042,683 B2
(45) Date of Patent: May 26, 2015

(54) OPTICAL MODULATOR INCLUDING GRAPHENE

(75) Inventors: Seong-ho Cho, Gwacheon-si (KR); Hyun-jong Chung, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 96 days.

(21) Appl. No.: 13/550,802

(22) Filed: Jul. 17, 2012

(65) Prior Publication Data
US 2013/0101247 A1 Apr. 25, 2013

(30) Foreign Application Priority Data
Oct. 19, 2011 (KR) .................. 10-2011-0107056

(51) Int. Cl.
G02F 1/035 (2006.01)
G02F 1/025 (2006.01)
G02F 1/015 (2006.01)

(52) U.S. Cl.
CPC ........ *G02F 1/025* (2013.01); *G02F 2001/0156* (2013.01); *G02F 2202/02* (2013.01)

(58) Field of Classification Search
USPC ........................................................... 385/2
See application file for complete search history.

(56) References Cited

U.S. PATENT DOCUMENTS
2011/0042650 A1 2/2011 Avouris et al.

FOREIGN PATENT DOCUMENTS
WO WO 2012/145605 A1 10/2012

OTHER PUBLICATIONS

Ming Liu et al., "Double-Layer Graphene Optical Modulator", Nov. 29, 2011, ACS Publications, Nano Letters, pp. A-D.*
Kim et al., "Columb drag of massless fermions in graphene", Apr. 8, 2011, American Physical Society, pp. 161401-1 thru 161401-4.*
European Search Report dated Nov. 30, 2012 issued in European Application No. 12180456.
Liu, et al., "Double-Layer Graphene Optical Modulator," *Nano Lett.*, vol. 12, pp. 1482-1485 (2012).
Liu, et al., "A graphene-based broadband optical modulator," *Nature*, vol. 474, pp. 64-67 (Jun. 2, 2011).
Kim, et al., "A role for graphene in silicon-based semiconductor devices," *Nature*, vol. 479, pp. 338-344 (Nov. 17, 2011).
Liu, et al., "Graphene optical modulator," *Carbon Nanotubes, Graphene and Associated Devices IV*, Proc. of SPIE, vol. 8101, pp. 81010J-1-81010J-6 (© 2011).
Koester, et al., "High-speed waveguide-coupled graphene-on-graphene optical modulators," *Applied Physics Letters*, vol. 100, pp. 171107-1-171107-4 (2012).
Mueller, T. et al., "Graphene photodetectors for high-speed optical communications", Nature Photonics, vol. 4, May 2010, pp. 297-301.
Liu, M. et al., "A graphene-based broadband optical modulator", Nature, vol. 474, Jun. 4, 2011, pp. 64-67.
"Graphene optical modulators could lead to ultrafast communications", Physorg.com, May 8, 2011, pp. 1-3.

* cited by examiner

*Primary Examiner* — Mike Stahl
*Assistant Examiner* — Kajli Prince
(74) *Attorney, Agent, or Firm* — Harness, Dickey & Pierce, P.L.C.

(57) ABSTRACT

An optical modulator includes a first graphene and a second graphene on an upper surface of a semiconductor layer, a first electrode on the first graphene, and a second electrode on the second graphene. Respective side surfaces of the first graphene and the second graphene are separated from each other. A first ridge portion of the semiconductor layer and a second ridge portion on the second graphene constitute an optical waveguide, and the first and second graphenes are on a center portion of the optical waveguide in a vertical direction to the semiconductor.

22 Claims, 3 Drawing Sheets

OPTICAL MODULATOR INCLUDING GRAPHENE

CROSS-REFERENCE TO RELATED APPLICATIONS

This application claims the benefit of Korean Patent Application No. 10-2011-0107056, filed on Oct. 19, 2011, in the Korean Intellectual Property Office, the disclosure of which is incorporated herein in its entirety by reference.

BACKGROUND

1. Field

Some example embodiments relate to electro-absorption optical modulators that include graphene.

2. Description of the Related Art

Optical modulators are apparatuses for transmitting information by changing the characteristics of light, for example, light intensity or phase of the light. The optical modulator may operate according to a change of an electro-refraction or an electro-absorption caused by an electric current or a voltage applied to an optical waveguide through which the light passes, for example, an optical waveguide of a semiconductor material.

An electro-absorption optical modulator operates based on a change of a light-absorption rate caused by a change in a bandgap size due to the Franz Keldysh effect after applying a bias voltage to an optical waveguide.

In most conventional optical modulators, the characteristics of light are changed with respect to the light of a certain wavelength, and thus, an operation bandwidth of the optical modulators is narrow, that is, about 20 nm or less. In addition, manufacturing a relatively high speed optical modulator due to a resistance-capacitance (RC) delay may be difficult. In addition, since a modulation depth per unit length of the optical waveguide is relatively small, a size of the optical modulator may be increased in order to modulate the light sufficiently.

Graphene is a material having a two-dimensional hexagonal carbon structure. Graphene may be used instead of semiconductors and has a carrier mobility of about 200,000 cm2V-1s-1 at room temperature, which is one hundred times higher than that of silicon, and thus, may be used in a higher speed operation device, for example, an optical modulator.

SUMMARY

Some example embodiments provide optical modulators including graphene, the optical modulators having a deeper modulation depth, smaller size and/or high operating speed.

Additional aspects will be set forth in part in the description which follows and, in part, will be apparent from the description, or may be learned by practice of the presented embodiments.

According to an example embodiment, an optical modulator includes a first graphene and a second graphene on an upper surface of a semiconductor layer, a first electrode on the first graphene, and a second electrode on the second graphene. Respective side surfaces of the first graphene and the second graphene are separate from each other.

At least one of the first graphene and the second graphene may have a bent structure so as to cover an upper surface and a side surface of a first ridge portion included in the semiconductor layer.

The optical modulator may further include a first insulating layer between the semiconductor layer and the first graphene, and a second insulating layer between the first graphene and the second graphene.

The first insulating layer and the second insulating layer may each include one of silicon oxide, aluminum oxide, silicon nitride, boron nitride, and hexagonal boron nitride. The second insulating layer may be formed to a thickness of about 1 nm to about 100 nm.

The semiconductor layer may include the first ridge portion, and a second ridge portion may be on the second graphene and configured to face the first ridge portion. The optical modulator may further include a third insulating layer between the second graphene and the second ridge portion. The semiconductor layer may include one of silicon, germanium, Group III-V semiconductor, and Group II-IV semiconductor.

The first ridge portion of the semiconductor layer and the second ridge portion may constitute an optical waveguide, and the first graphene and the second graphene may be formed on a center portion of the optical waveguide in a vertical direction to the semiconductor layer.

The first ridge portion may be an epitaxially grown silicon layer, and the second ridge portion may be one of a polysilicon layer and an amorphous silicon layer. Each of the first graphene and the second graphene may be one of a single-layered graphene and a bi-layered graphene.

According to another example embodiment, an optical modulator includes a first graphene and a second graphene on an upper surface of a semiconductor layer, a first electrode on the first graphene, and a second electrode on the second graphene. The first graphene and the second graphene have plane structures parallel to a bottom surface of the semiconductor layer, and respective side surfaces of the first graphene and the second graphene are separate from each other.

According to another example embodiment, an optical modulator includes a first graphene and a second graphene on an upper surface of the semiconductor layer, a first electrode on the first graphene, and a second electrode on the second graphene. A side surface of the first graphene and a side surface of the second graphene are separated by a first gap from each other in a direction parallel to a bottom surface of the semiconductor layer.

At least one of the first graphene and the second graphene may have a bent structure so as to cover an upper surface and a side surface of a first ridge portion included in the semiconductor layer. The first gap may be about 1 nm to about 100 nm.

According to another example embodiment, an optical modulator includes a first graphene and a second graphene on an upper surface of the semiconductor layer, a first electrode on the first graphene, and a second electrode on the second graphene. The first graphene and the second graphene have plane structures parallel to a bottom surface of the semiconductor layer, and a side surface of the first graphene and a side surface of the second graphene are separated by a first gap from each other in a direction parallel to the bottom surface of the semiconductor layer.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
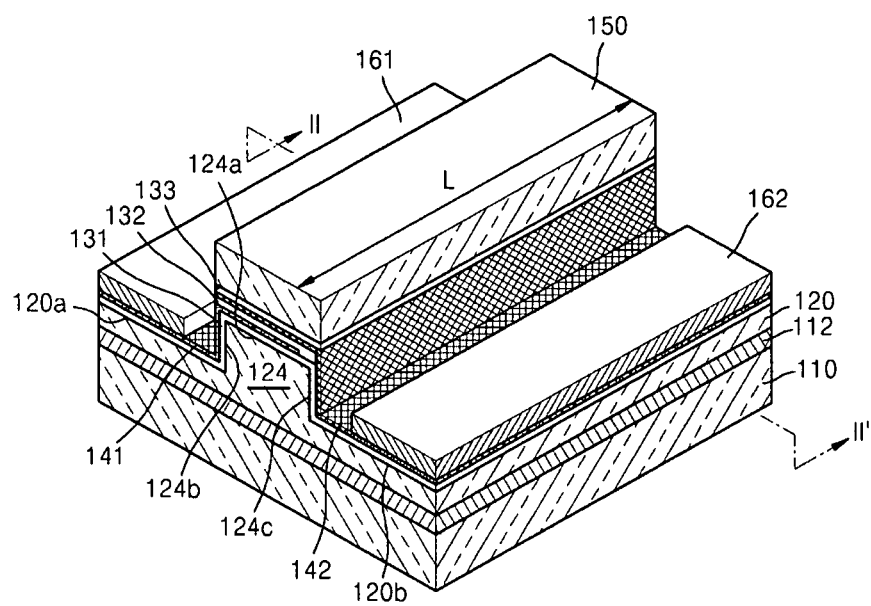
FIG. 1 is a perspective view of an optical modulator according to an example embodiment.

Reference will now be made in detail to embodiments, examples of which are illustrated in the accompanying drawings, wherein like reference numerals refer to the like elements throughout. In this regard, example embodiments may have different forms and should not be construed as being limited to the descriptions set forth herein. Accordingly, example embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

It will be understood that, although the terms "first", "second", etc. may be used herein to describe various elements, components, regions, layers and/or sections, these elements, components, regions, layers and/or sections are not to be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments are not to be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, is to be interpreted as having a meaning that is consistent with their meaning in the context of the relevant art and will not be interpreted in an idealized or overly formal sense unless expressly so defined herein.

Figure 2:
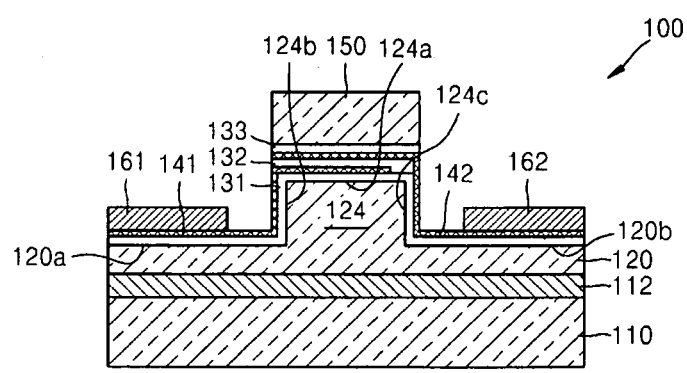
FIG. 2 is a cross-sectional view of the optical modulator taken along line II-II' of FIG. 1.

FIG. 1 is a perspective view of an optical modulator 100 according to an example embodiment, and FIG. 2 is a cross-sectional view of the optical modulator 100 taken along a line II-II' of FIG. 1.

Referring to FIGS. 1 and 2, an oxide layer 112 is formed on a substrate 110, and a semiconductor layer 120 including a first ridge portion 124 is formed on the oxide layer 112. The substrate 110 may be formed of silicon, germanium, silicon-germanium, Group III-V semiconductor, or Group II-VI semiconductor. As shown in FIGS. 1 and 2, the first ridge portion 124 is a portion protruding from bottom surfaces 120a and 120b, and may include an upper surface 124a that is parallel to the bottom surfaces 120a and 120b and side surfaces 124b and 124c. However, the inventive concepts are not limited thereto. As an example, the side surfaces 124b and 124c may not be perpendicular to the bottom surfaces 120a and 120b unlike FIGS. 1 and 2, and the upper surface 124a may be modified to have shapes other than the plane structure according to the final use of the optical modulator.

The oxide layer 112 on the substrate 110 may be a buried oxide layer. When the substrate 110 and the semiconductor layer 120 are formed of silicon and the oxide layer 112 is the buried oxide layer formed of silicon oxide, they may form a structure in which a ridge portion is formed on a silicon-on-insulator (SOI) substrate 110.

The semiconductor layer 120 including the first ridge portion 124 may be formed of the same material as the substrate 110.

A first insulating layer 131 is formed on the semiconductor layer 120 including the first ridge portion 124. The first insulating layer 131 may be formed of silicon oxide, aluminum oxide, silicon nitride, boron nitride, or hexagonal boron nitride to a thickness of about a few nm to about hundreds of nm.

A first graphene 141 is formed on the first insulating layer 131. The first graphene 141 may be formed by transferring graphene manufactured by chemical vapor deposition (CVD) onto the first insulating layer 131. As shown in FIGS. 1 and 2, the first graphene 141 may have a bent structure, and may be formed only on the upper surface 124a and the side surface 124b of the first ridge portion 124, and on the bottom surface 120a extending from the side surface 124b. In addition, the first graphene 141 is formed to be separated from a right edge of the first ridge portion 124 on the upper surface 124a of the first ridge portion 124. A first electrode 161 is formed on the first graphene 141 to be separated from the first ridge portion 124.

A second insulating layer 132 that covers the first graphene 141 on the upper surface 124a of the first ridge portion 124 is formed. The second insulating layer 132 may cover the first insulating layer 131 by extending to the other side surface 124c of the first ridge portion 124 and the other bottom surface 120b. The second insulating layer 132 may be formed of silicon oxide, aluminum oxide, silicon nitride, boron nitride, or hexagonal boron nitride to a thickness of about 1 nm to about 100 nm. If the thickness of the second insulating layer 132 is less than 1 nm, capacitance increases and a resistance-capacitance (RC) delay increases. Thus, an operating speed of the optical modulator 100 may be reduced. If the thickness of the second insulating layer 132 is greater than 100 nm, a driving voltage of the optical modulator 100 may be increased.

A second graphene 142 is formed on the second insulating layer 132. A side surface of the second graphene 142 may be formed in parallel with a side of the first graphene 141 in a direction perpendicular to the bottom surfaces 120a and 120b. The second graphene 142 may be formed by transferring graphene fabricated in the CVD process on the second insulating layer 132. As shown in FIGS. 1 and 2, the second graphene 142 may have a bent structure, and may extend from the upper portion of the first ridge portion 124 to the other side surface 124c of the first ridge portion 124 and the other bottom surface 120b.

The first and second graphene layers 141 and 142 each may be a single-layered or a bi-layered graphene layer.

A second electrode 162 is formed on the second graphene 142 above the other bottom surface 120b, so as to be separated from the first ridge portion 124. The first and second electrodes 161 and 162 may be formed of a general electrode material, for example, gold, copper, molybdenum, or palladium.

Figure 3:
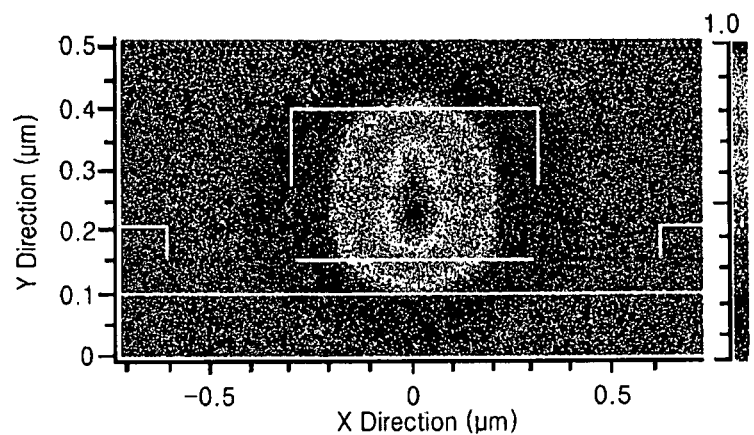
FIG. 3 is a diagram showing light intensity when a voltage is applied to the optical modulator of FIG. 1.

Each of the first and second electrodes 161 and 162 may be formed to be separated by about 100 nm to about a few μm from the first ridge portion 124. As shown in FIG. 3, since a light-transmitting region through an optical waveguide is greater than the optical waveguide, the first and second electrodes 161 and 162 are separated by a given (or alternatively, predetermined) distance from the first ridge portion 124 in order not to interfere with the light transmission. According to the present embodiment, the first graphene 141 connected to the first electrode 161 and the second graphene 142 connected to the second electrode 162 are disposed on the light-transmitting region, and the first and second graphenes 141 and 142 are transparent in the light-transmitting region.

A third insulating layer 133 is formed on the second graphene 142 above the upper surface 124a of the first ridge portion 124. The third insulating layer 133 may be formed of the same material as the first insulating layer 131 to a thickness of about a few nm to about hundreds of nm.

A second ridge portion 150 is formed on the third insulating layer 133 to face the first ridge portion 124. The second ridge portion 150 may have a height approximately equal to that of the first ridge portion 124. The first and second ridge portions 124 and 150, and the layers disposed between the first and second ridge portions 124 and 150 constitute the optical waveguide. When the first and second ridge portions 124 and 150 are formed to have the approximately equal heights, the first and second graphenes 141 and 142 may be located at approximately center portion of the optical waveguide in a vertical direction to the bottom surfaces 120a and 120b.

When the first through third insulating layers 131 through 133 are formed of the boron nitride or the hexagonal boron nitride, degradation of mobility of light in the first and second graphenes 141 and 142 is reduced.

The second ridge portion 150 may be formed of a material having a similar refractive index to that of the first ridge portion 124. For example, the second ridge portion 150 may be formed of the same material as the first ridge portion 124. The first ridge portion 124 may be a semiconductor layer that is epitaxially grown, and the second ridge portion 150 may be a deposited semiconductor layer. For example, the first ridge portion 124 may be a silicon epitaxial layer and the second ridge portion 150 may be a polysilicon layer or an amorphous silicon layer.

FIG. 3 is a simulation diagram showing light intensity when a voltage is applied to the optical modulator 100 according to an example embodiment.

Referring to FIG. 3, when a given (or alternatively, predetermined) voltage is applied between the first and second electrodes 161 and 162, the Fermi level of one of the first and second graphenes 141 and 142 is reduced and the Fermi level of the other is increased. Accordingly, an amount of carriers absorbed by the first and second graphenes 141 and 142 is reduced, and an intensity of light passing through the optical waveguide is increased. Therefore, the intensity of light that is transmitted through the optical waveguide is increased. The above operation may be used to adjust light transmission through the optical modulator 100.

On the other hand, the first and second graphenes 141 and 142 are disposed on the center portion of the optical waveguide where the light intensity is higher, and thus, a modulation depth of the light is increased. Accordingly, a length (L of FIG. 1) of the optical waveguide may be reduced, and the size of the optical modulator 100 may also be reduced.

Figure 4:
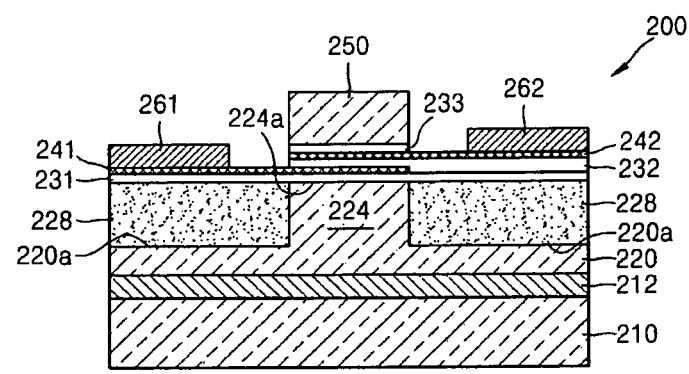
FIG. 4 is a schematic cross-sectional view of an optical modulator according to another example embodiment.

FIG. 4 is a schematic cross-sectional view of an optical modulator 200 according to another example embodiment. Like reference numerals denote the same components as in FIGS. 1 and 2, and detailed descriptions thereof will not be provided here.

Referring to FIG. 4, an oxide layer 212 is formed on a substrate 210, and a semiconductor layer 220 including a first ridge portion 224 is formed on the oxide layer 212. The substrate 210 may be formed of silicon, germanium, silicon-germanium, Group III-V semiconductor, or Group II-VI semiconductor.

The oxide layer 212 on the substrate 210 may be a buried oxide layer. When the substrate 210 and the semiconductor layer 220 are formed of silicon and the oxide layer 212 is the buried oxide layer formed of silicon oxide, a structure in which a ridge portion is formed on a silicon-on-insulator (SOI) substrate 210 is formed.

An insulating layer 228 is formed on a bottom surface 220a of the semiconductor layer 220 including the first ridge portion 224 to have the same height with an upper surface 224a of the first ridge portion 224.

A first insulating layer 231 is formed on an upper surface 224a of the first ridge portion 224. The first insulating layer 231 may be extended onto the insulating layer 228. The first insulating layer 231 may be formed of silicon oxide, aluminum oxide, silicon nitride, boron nitride, or hexagonal boron nitride to a thickness of about a few nm to about hundreds of nm. A first graphene 241 is formed on the first insulating layer 231. The first graphene 241 is formed to cover the upper surface 224a of the first ridge portion 224 and the insulating layer 228 at one side of the first ridge portion 224. The first graphene 241 may be formed by transferring graphene that is fabricated in a CVD process onto the first insulating layer 231. A first electrode 261 is formed on the first graphene 241 so as to be separated from the first ridge portion 224.

A second insulating layer 232 is formed on the upper surface 224a of the first ridge portion 224 above the first graphene 241. The second insulating layer 232 may be extended onto the insulating layer 228 at the other side of the first ridge portion 224. The second insulating layer 232 may be formed of silicon oxide, aluminum oxide, silicon nitride, boron nitride, or hexagonal boron nitride to a thickness of about 1 nm to about 100 nm.

A second graphene 242 is formed to extend from the upper surface 224a of the first ridge portion 224 above the second insulating 232 to the insulating layer 228 at the other side of the first ridge portion 224. A side of the second graphene 242 may be formed in parallel with a side of the first graphene 241 in a direction perpendicular to the bottom surface 220a of the semiconductor layer 220. The second graphene 242 may be formed by transferring graphene fabricated in the CVD process onto the second insulating layer 232. Unlike the first and second graphenes 141 and 142 of FIGS. 1 and 2, the first and second graphenes 241 and 242 of FIG. 3 may have plane structures.

Each of the first and second graphenes 241 and 242 may be a single-layered or a bi-layered graphene layer. A third insulating layer 233 is formed on the second graphene 242 above the upper surface 224a of the first ridge portion 224. The third insulating layer 233 is formed of the same material as the first insulating layer 231 to a thickness of about a few nm to about hundreds of nm.

A second ridge portion 250 is formed on the third insulating layer 233 to face the first ridge portion 224. A height of the second ridge portion 250 may be similar to that of the first ridge portion 224. The first and second ridge portions 224 and 250 and the layers located between the first and second ridge portions 224 and 250 constitute an optical waveguide. Since the first and second ridge portions 224 and 250 have similar heights to each other, the first and second graphenes 241 and 242 may be located at an approximately center portion of the optical waveguide on a vertical surface.

When the first through third insulating layers 231 through 233 are formed of the boron nitride or the hexagonal boron nitride, degradation of mobility of the light in the first and second graphenes 241 and 242 is reduced.

The second ridge portion 250 may be formed of a material having a similar refractive index to that of the first ridge portion 224. Otherwise, the second ridge portion 250 may be formed of the same material as the first ridge portion 224. For example, the first ridge portion 224 may be a silicon epitaxial layer and the second ridge portion 250 may be a polysilicon layer or an amorphous silicon layer.

A second electrode 262 is formed on the second graphene 242 to be separated from the first ridge portion 224. The first and second electrodes 261 and 262 may be formed of a conventional electrode material, for example, gold, copper, platinum, molybdenum, or palladium.

According to the optical modulator 200 of the present embodiment, the insulating layer 228 having the same plane as the ridge portion is formed on both sides of the ridge portion, and thus, the graphenes and the insulating layers may be more easily formed on the first ridge portion 224. Other operations of the optical modulator 200 are the same as those of the optical modulator 100, and detailed descriptions thereof are not provided here.

Figure 5:
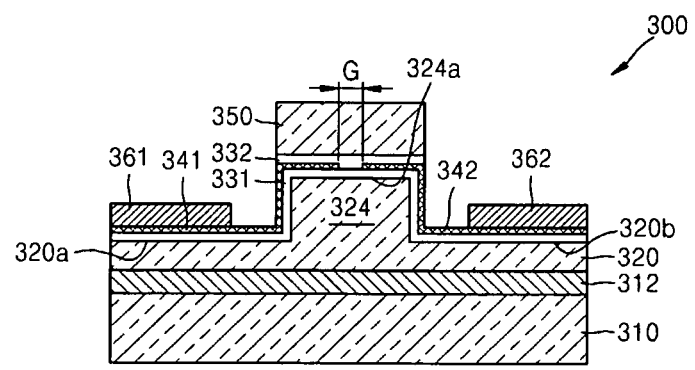
FIG. 5 is a schematic cross-sectional view of an optical modulator according to another example embodiment.

FIG. 5 is a schematic cross-sectional view of an optical modulator 300 according to still another example embodiment. Referring to FIG. 5, an oxide layer 312 is formed on a substrate 310, and a semiconductor layer 320 including a first ridge portion 324 is formed on the oxide layer 312. The substrate 310 may be formed of silicon, germanium, silicon-germanium, Group III-V semiconductor, or Group II-VI semiconductor.

The oxide layer 312 on the substrate 310 may be a buried oxide layer. When the substrate 310 and the semiconductor layer 320 are formed of silicon and the oxide layer 312 is the buried oxide layer formed of silicon oxide, a structure in which a ridge portion is formed on a silicon-on-insulator (SOI) substrate 310 is formed.

The semiconductor layer 320 including the first ridge portion 324 may be formed of the same material as the substrate 310. A first insulating layer 331 is formed on the semiconductor layer 320 including the first ridge portion 324. The first insulating layer 331 may be formed of silicon oxide, aluminum oxide, silicon nitride, boron nitride, or hexagonal boron nitride to a thickness of about a few nm to about hundreds of nm.

A first graphene 341 and a second graphene 342 that are respectively extended from an upper surface 324a of the first ridge portion 324 to bottom surfaces 320a and 320b of the semiconductor layer 320 are formed on the first insulating layer 331. The first and second graphenes 341 and 342 may be formed by transferring graphene fabricated in a CVD process onto the first insulating layer 331. Each of the first and second graphenes 341 and 342 may have a single-layered or a bi-layered structure, and may have a bent structure like in FIGS. 1 and 2.

A side of the first graphene 341 and a side of the second graphene 342 may be separated from each other by a first gap G therebetween in a direction parallel to the bottom surfaces 320a and 320b, on the first insulating layer 331 above the upper surface 324a of the first ridge portion 324. The first and second graphenes 341 and 342 are disposed so that the first gap G may be disposed at a center portion on the upper surfaces 324a of the first ridge portion 324. The first gap G may range from 1 nm to 100 nm. When the first gap G is less than 1 nm, a capacitance increases and an RC delay is increased, and thus, an operating speed of the optical modulator may be reduced. When the first gap G is greater than 100 nm, a driving voltage of the optical modulator may be increased.

A first electrode 361 is formed on the first graphene 341 to be separated from the first ridge portion 324, and a second electrode 362 is formed on the second graphene 342 to be separated from the first ridge portion 324.

The first and second electrodes 361 and 362 may be formed of a general electrode material, for example, gold, copper, platinum, molybdenum, or palladium.

A second insulating layer 332 is formed on the first insulating layer 331 to cover the first graphene 341 and the second graphene 342. The second insulating layer 332 may be formed of the same material as the first insulating layer 331 to a thickness of about a few nm to about hundreds of nm.

A second ridge portion 350 is formed on the second insulating layer 332 to face the first ridge portion 324. A height of the second ridge portion 350 may be similar to that of the first ridge portion 324. The first and second ridge portions 324 and 350 and the layers located between the first and second ridge portions 324 and 350 constitute an optical waveguide. Since the first and second ridge portions 324 and 350 have similar heights to each other, the first and second graphenes 341 and 342 may be located on an approximately center portion of the optical waveguide in a vertical direction to the bottom surfaces 320a and 320b.

When the first and second insulating layers 331 and 332 are formed of the boron nitride or the hexagonal boron nitride, degradation of mobility of light in the first and second graphenes 341 and 342 is reduced.

The second ridge portion 350 may be formed of a material having a similar refractive index to that of the first ridge portion 324. Otherwise, the second ridge portion 350 may be formed of the same material as that of the first ridge portion 324. The first ridge portion 424 may be a semiconductor layer that is epitaxially grown, and the second ridge portion 450 may be a deposited semiconductor layer. For example, the first ridge portion 324 may be a silicon epitaxial layer and the second ridge portion 350 may be a polysilicon layer or an amorphous silicon layer.

The optical modulator 300 according to the present embodiment has a simple structure and thus may be fabricated easily, when compared with the optical modulator 100. Since operations of the optical modulator 300 are the same as those of the optical modulator 100, descriptions thereof are not provided here.

Figure 6:
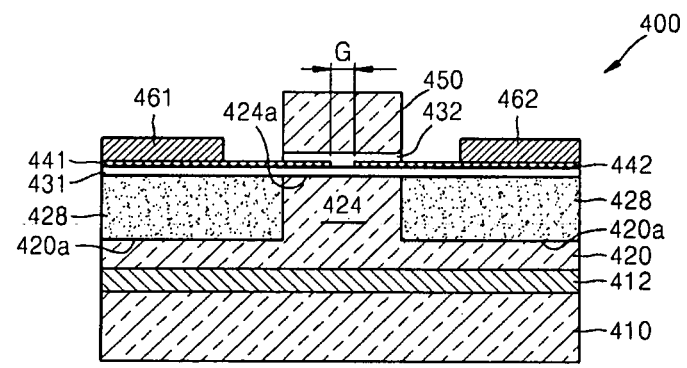
FIG. 6 is a schematic cross-sectional view of an optical modulator according to another example embodiment.

FIG. 6 is a schematic cross-sectional view of an optical modulator 400 according to another example embodiment. Referring to FIG. 6, an oxide layer 412 is formed on a substrate 410, and a semiconductor layer 420 including a first ridge portion 424 is formed on the oxide layer 412. The substrate 410 may be formed of silicon, germanium, silicon-germanium, Group III-V semiconductor, or Group II-VI semiconductor.

The oxide layer 412 on the substrate 410 may be a buried oxide layer. When the substrate 410 and the semiconductor layer 420 are formed of silicon and the oxide layer 412 is the buried oxide layer formed of silicon oxide, a structure, in which a ridge portion is formed on a silicon-on-insulator (SOI) substrate 410, is formed.

An insulating layer 428 is formed on a bottom surface 420a of the semiconductor layer 420 including the first ridge portion 424 to have the same height with an upper surface 424a of the first ridge portion 424.

A first insulating layer 431 is formed on the upper surface 424a of the first ridge portion 424. The first insulating layer 431 may be extended onto the insulating layer 428. The first insulating layer 431 may be formed of silicon oxide, aluminum oxide, silicon nitride, boron nitride, or hexagonal boron nitride to a thickness of about a few nm to about hundreds of nm. A first graphene 441 and a second graphene 442 that are respectively extended from the upper surface 424a of the first ridge portion 424 to bottom surfaces 420a and 420b of the semiconductor layer 420 are formed on the first insulating layer 431. The first and second graphenes 441 and 442 may be formed by transferring graphene fabricated in a CVD process onto the first insulating layer 431. Each of the first and second graphenes 441 and 442 may have a single-layered or a bi-layered structure.

A side of the first graphene 441 and a side of the second graphene 442 may be separated from each other by a first gap G therebetween in a direction parallel with the bottom surfaces 420a and 420b, on the first insulating layer 431 above the upper surface 424a of the first ridge portion 424. The first gap G may range from 1 nm to 100 nm. The first gap G may be disposed at a center portion on the upper surfaces 424a of the first ridge portion 424.

A first electrode 461 is formed on the first graphene 441 above the insulating layer 428 so as to be separated from the first ridge portion 424, and a second electrode 462 is formed on the second graphene 442 above the insulating layer 428 so as to be separated from the first ridge portion 424. The first and second electrodes 461 and 462 may be formed of a general electrode material, for example, gold, copper, platinum, molybdenum, or palladium.

A second insulating layer 432 is formed on the first insulating layer 431 to cover a portion of the first graphene 441 and a portion of the second graphene 442. The second insulating layer 432 may be formed of silicon oxide, aluminum oxide, silicon nitride, boron nitride, or hexagonal boron nitride to a thickness of about a few nm to about hundreds of nm.

A second ridge portion 450 is formed on the second insulating layer 432 to face the first ridge portion 424. A height of the second ridge portion 450 may be similar to that of the first ridge portion 424. The first and second ridge portions 424 and 450 and the layers located between the first and second ridge portions 424 and 450 constitute an optical waveguide. Since the first and second ridge portions 424 and 450 have approximately the same heights, the first and second graphenes 441 and 442 may be located at an approximately center portion of the optical waveguide in a vertical direction to the bottom surface 420a.

The second ridge portion 450 may be formed of a material having a similar refractive index to that of the first ridge portion 424, or the same material as that of the first ridge portion 424. The first ridge portion 424 may be a semiconductor layer that is epitaxially grown, and the second ridge portion 450 may be a deposited semiconductor layer. For example, the first ridge portion 424 may be a silicon epitaxial layer and the second ridge portion 450 may be a polysilicon layer or an amorphous silicon layer.

According to the optical modulator 400 of the present embodiment, since the insulating layer 428 having the upper surface at the same level as the upper surface of the first ridge portion 424 is formed on both sides of the first ridge portion 424, the graphenes may be more easily formed on the first ridge portion 424. Operations of the optical modulator 400 are the same as those of the optical modulator 100, and detailed descriptions thereof are not provided here.

According to the optical modulator using graphene of the inventive concepts, two graphenes connected to the electrodes are disposed on the center portion of the optical waveguide to increase the light absorption of the graphene. Thus, the modulation depth of the light is increased and the size of the optical modulator may be reduced.

It should be understood that example embodiments described therein should be considered in a descriptive sense only and not for purposes of limitation. Descriptions of features or aspects within each example embodiment should typically be considered as available for other similar features or aspects in other example embodiments.

What is claimed is:

1. An optical modulator comprising:
   a first graphene and a second graphene on an upper surface of a semiconductor layer, the first graphene and the second graphene separate from each other;
   a first electrode on the first graphene; and
   a second electrode on the second grapheme,
   wherein at least one of the first graphene and the second graphene has a bent structure so as to cover an upper surface and a side surface of a first ridge portion included in the semiconductor layer.

2. The optical modulator of claim 1, further comprising:
   a first insulating layer between the semiconductor layer and the first graphene; and
   a second insulating layer between the first graphene and the second graphene.

3. The optical modulator of claim 2, wherein the first insulating layer and the second insulating layer each include one of silicon oxide, aluminum oxide, silicon nitride, boron nitride, and hexagonal boron nitride.

4. The optical modulator of claim 2, wherein the second insulating layer is formed to a thickness of about 1 nm to about 100 nm.

5. The optical modulator of claim 1, wherein each of the first graphene and the second graphene is one of a single-layered graphene and a bi-layered graphene.

6. An optical modulator comprising;
a first graphene and a second graphene on an upper surface of a semiconductor layer, the first graphene and the second graphene separate from each other;
a first insulating layer between the semiconductor layer and the first graphene;
a second insulating layer between the first graphene and the second grapheme;
a first electrode on the first graphene; and
a second electrode on the second graphene,
wherein the semiconductor layer includes a first ridge portion, and a second ridge portion on the second graphene, the second ridge portion configured to face the first ridge portion.

7. The optical modulator of claim 6, further comprising:
a third insulating layer between the second graphene and the second ridge portion.

8. The optical modulator of claim 7, wherein the third insulating layer includes one of silicon oxide, aluminum oxide, silicon nitride, boron nitride, and hexagonal boron nitride.

9. The optical modulator of claim 6, wherein the semiconductor layer includes one of silicon, germanium, Group III-V semiconductor, and Group II-IV semiconductor.

10. The optical modulator of claim 6, wherein the first ridge portion of the semiconductor layer and the second ridge portion constitute an optical waveguide, and the first graphene and the second graphene are formed on a center portion of the optical waveguide in a vertical direction to the semiconductor layer.

11. The optical modulator of claim 10, wherein the first ridge portion is an epitaxially grown silicon layer, and the second ridge portion is one of a polysilicon layer and an amorphous silicon layer.

12. An optical modulator comprising:
a first graphene and a second graphene on an upper surface of a semiconductor layer, the first graphene and the second graphene having respective side surfaces separate from each other and having plane structures parallel to a bottom surface of the semiconductor layer;
a first electrode on the first graphene; and
a second electrode on the second graphene.

13. The optical modulator of claim 12, further comprising:
a first insulating layer between the semiconductor layer and the first graphene; and
a second insulating layer between the first graphene and the second graphene.

14. The optical modulator of claim 13, wherein the first insulating layer and the second insulating layer each include one of silicon oxide, aluminum oxide, silicon nitride, boron nitride, and hexagonal boron nitride.

15. The optical modulator of claim 13, wherein the second insulating layer is formed to a thickness of about 1 nm to about 100 nm.

16. The optical modulator of claim 13, wherein the semiconductor layer includes a first ridge portion, and a second ridge portion on the second graphene, the second ridge portion configured to face the first ridge portion.

17. The optical modulator of claim 16, further comprising:
a third insulating layer between the second graphene and the second ridge portion.

18. The optical modulator of claim 17, wherein the third insulating layer includes one of silicon oxide, aluminum oxide, silicon nitride, boron nitride, and hexagonal boron nitride.

19. The optical modulator of claim 16, wherein the semiconductor layer includes one of silicon, germanium, Group III-V semiconductor, and Group II-IV semiconductor.

20. The optical modulator of claim 16, wherein the first ridge portion of the semiconductor layer and the second ridge portion constitute an optical waveguide, and the first graphene and the second graphene are formed on a center portion of the optical waveguide in a vertical direction to the bottom surface of the semiconductor layer.

21. The optical modulator of claim 20, wherein the first ridge portion is an epitaxially grown silicon layer, and the second ridge portion is one of a polysilicon layer and an amorphous silicon layer.

22. The optical modulator of claim 12, wherein each of the first graphene and the second graphene is one of a single-layered graphene and a bi-layered graphene.

* * * * *